(12) United States Patent
Deng et al.

(10) Patent No.: US 12,237,723 B2
(45) Date of Patent: Feb. 25, 2025

(54) ELECTRIC MACHINE AND VEHICLE HAVING ASYMMETRIC ROTOR LAMINATIONS

(71) Applicant: FORD GLOBAL TECHNOLOGIES, LLC, Dearborn, MI (US)

(72) Inventors: Chuan Deng, Nanjing (CN); Guohua Du, Nanjing (CN); Yigang Yuan, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 628 days.

(21) Appl. No.: 17/412,585

(22) Filed: Aug. 26, 2021

(65) Prior Publication Data

US 2022/0069647 A1  Mar. 3, 2022

(30) Foreign Application Priority Data

Aug. 26, 2020  (CN) .......................... 202010869173.2

(51) Int. Cl.
| | |
|---|---|
| *H02K 1/27* | (2022.01) |
| *B60K 1/00* | (2006.01) |
| *B60L 50/60* | (2019.01) |
| *H02K 1/276* | (2022.01) |
| *H02K 21/14* | (2006.01) |
| *H02K 29/03* | (2006.01) |

(52) U.S. Cl.
CPC ............... *H02K 1/276* (2013.01); *B60K 1/00* (2013.01); *B60L 50/60* (2019.02); *H02K 21/14* (2013.01); *H02K 29/03* (2013.01)

(58) Field of Classification Search
CPC ...... H02K 1/2766; H02K 21/14; H02K 1/276; H02K 2201/06; H02K 2213/03; H02K 29/03; B60L 58/20; B60L 50/61; B60L 58/24; B60L 58/12; B60L 50/60; B60L 2220/50; B60K 1/00; Y02T 10/64; Y02T 10/62; Y02T 10/70

USPC ...................................................... 310/156.56
See application file for complete search history.

(56) References Cited

U.S. PATENT DOCUMENTS

| | | | |
|---|---|---|---|
| 9,985,484 B2 * | 5/2018 | Liang .................. | H02K 1/2766 |
| 2015/0288261 A1 * | 10/2015 | McAleese ............. | H02K 41/03 29/596 |
| 2016/0365762 A1 * | 12/2016 | Liang .................. | H02K 1/2766 |

(Continued)

*Primary Examiner* — Alex W Mok
(74) *Attorney, Agent, or Firm* — Brooks Kushman PC; David B. Kelley (57) ABSTRACT

An electric machine includes a stator rotatably supporting a rotor, the rotor includes a stacked rotor laminations forming a rotor core with cavities having magnets arranged in the cavities through at least two adjacent rotor laminations and parallel to a rotor central axis, each lamination including an outer edge having grooves or scallops arranged asymmetrically about the circumference to reduce torque ripple. At least one groove or scallop may be arranged along a q-axis and at least one groove or scallop may be arranged between a q-axis and a d-axis of the rotor core. The laminations may be substantially identical with a first group of laminations flipped or rotated about a diametric axis relative to a second group of laminations. An electrified vehicle includes an electric machine powered by a traction battery, the electric machine having a rotor core with stacked rotor laminations having a scalloped outer edge.

19 Claims, 6 Drawing Sheets

(56) References Cited

U.S. PATENT DOCUMENTS

2019/0036398 A1* 1/2019 Liang ..................... H02K 21/14
2019/0089214 A1* 3/2019 Tang ................... H02K 1/2766

* cited by examiner

ELECTRIC MACHINE AND VEHICLE HAVING ASYMMETRIC ROTOR LAMINATIONS

CROSS-REFERENCE TO RELATED APPLICATIONS

This application claims foreign priority benefits under 35 U.S.C. § 119 (a)-(d) to CN Application 2020 108 691 732 filed Aug. 26, 2020, which is hereby incorporated by reference in its entirety.

TECHNICAL FIELD

The present disclosure relates to an electric machine and a vehicle comprising the electric machine.

BACKGROUND

Many automakers currently produce electric vehicles and hybrid electric vehicles to improve fuel economy. These vehicles comprise traction batteries and one or more electric machines powered by the batteries. Each electric machine comprises a stator and a rotor rotatably supported in the stator. The rotor is mounted on a shaft that is drivably connected to the drive wheels through one or more powertrain components. Electric current flows through the stator winding to generate a magnetic field. The magnetic field generated by the stator can cooperate with the permanent magnets on the rotor to generate torque. The torque generated by the electric machine is transmitted to the drive wheels through the powertrain components to propel the vehicle.

SUMMARY

According to one aspect of the present disclosure, there is provided an electric machine comprising a stator and a rotor rotatably supported in the stator. The rotor comprises a plurality of rotor laminations stacked to form a rotor core with cavities and magnets arranged in the cavities. Each rotor lamination further comprises an outer edge having a plurality of arcuate grooves or scallops arranged asymmetrically around the outer edge.

According to an embodiment of the present disclosure, a portion of the plurality of rotor laminations are rotated or flipped by 180 degrees relative to the other portion of rotor laminations.

According to another embodiment of the present disclosure, the number of the portion of the rotor laminations is substantially equal to the number of the other portion of the rotor laminations.

According to another embodiment of the present disclosure, the plurality of grooves or scallops are located differently relative to two or more different magnetic poles.

According to another embodiment of the present disclosure, at least one of the plurality of grooves is located relative to a q-axis.

According to another embodiment of the present disclosure, at least one of the plurality of grooves is located between a d-axis and a q-axis.

According to another embodiment of the present disclosure, the plurality of grooves are arc-shaped grooves, and the arc-shaped grooves have a radius between 0.5 mm and 2 mm.

According to another embodiment of the present disclosure, the arc-shaped grooves have a depth less than or equal to 1.5 mm.

According to another embodiment of the present disclosure, the cavities comprise a plurality of first cavities and a plurality of second cavities arranged in a V-shape, and the magnets comprise first magnets arranged in the first cavities and second magnets arranged in the second cavities.

According to another embodiment of the present disclosure, the first magnets and the second magnets are aligned along the direction of a central axis of the rotor respectively.

According to another embodiment of the present disclosure, the rotor core comprises a first block and a second block respectively formed by one or more of the rotor laminations, and the second block is rotated or flipped by 180 degrees relative to the first block.

According to another embodiment of the present disclosure, the number of the rotor laminations in the first block and the number of the rotor laminations in the second block are substantially equal.

According to another aspect of the present disclosure, there is provided an electric machine comprising a stator and a rotor rotatably supported in the stator. The rotor comprises: a plurality of rotor laminations stacked to form a rotor core, each rotor lamination having an inner edge and an outer edge opposite to the inner edge, the rotor core having cavities arranged between the inner edge and the outer edge; and permanent magnets arranged in the cavities. Wherein each rotor lamination further comprises a plurality of grooves arranged asymmetrically on the outer edge. A portion of the plurality of rotor laminations are rotated or flipped by 180 degrees relative to the other portion of rotor laminations.

According to an embodiment of the present disclosure, at least one of the plurality of grooves is located on a q-axis.

According to another embodiment of the present disclosure, at least one of the plurality of grooves is located between a d-axis and a q-axis.

According to another embodiment of the present disclosure, the plurality of grooves are located on different magnetic poles.

According to another embodiment of the present disclosure, the rotor core comprises a first block and a second block respectively formed by one or more of the rotor laminations, and the second block is rotated or flipped by 180 degrees relative to the first block.

According to another embodiment of the present disclosure, the number of the rotor laminations in the first block and the number of the rotor laminations in the second block are substantially equal.

According to another embodiment of the present disclosure, the number of the first blocks is equal to the number of the second blocks.

According to another aspect of the present disclosure, a vehicle having the above-mentioned electric machine is provided.

DETAILED DESCRIPTION

Embodiments of the present disclosure are described below. However, it should be understood that the disclosed embodiments are only examples, and other embodiments may take various alternative forms. Drawings are not necessarily drawn to scale; and some functions may be exaggerated or minimized to show details of specific components. Therefore, the specific structural and functional details disclosed herein should not be interpreted as restrictive, but merely as a representative basis for teaching those skilled in the art to use the claimed subject matter in various ways. As will be understood by those of ordinary skill in the art, various features shown and described with reference to any one of the drawings may be combined with features shown in one or more other drawings to produce embodiments which may not be explicitly shown or described. The combination of the features shown provides representative embodiments for a typical application. However, various other combinations and modifications of features consistent with the teachings of the present disclosure may be expected for certain specific applications or embodiments.

Permanent magnet electric machines include magnets mounted on or embedded in a rotor surrounded by a stator. The magnets mounted on or embedded in the rotor are coupled with an internal magnetic field caused by the current of the motor and generated by the electrical input of the stator. Similar to other alternating current (AC) induction motors, electricity is supplied by the stator winding.

The individual stator tooth group and the stator winding form a plurality of magnetic poles that generate a magnetic flux flow pattern when the stator coils are energized with a multi-phase sinusoidal voltage. For example, a three-phase electric machine may have a total of 8 poles and 48 grooves. The magnetic flux generated by the stator winding interacts with the rotor flux generated by the permanent magnets in the rotor of the permanent magnet electric machine, so that rotor torque is generated when the stator winding is excited with a multi-phase voltage.

The permanent magnets of the rotor may be positioned or oriented in different ways to generate the desired magnetic field. Each magnetic pole may be formed by a single permanent magnet with one magnetic pole (i.e., north or south pole) oriented in a radially outward direction. The magnetic poles of the rotor may be formed by multiple sets of permanent magnets arranged to form magnetic poles together One such arrangement includes magnets oriented in a V-type pattern. The inner part of the "V" is a similar magnetic pole that cooperates to form a rotor magnetic pole. Each permanent magnet can be arranged in a pocket or cavity to hold the permanent magnet. These pockets or cavities are generally rectangular and sized to receive permanent magnets. The cavity may be slightly larger at the opposite ends to limit the leakage of magnetic flux between the north and south poles of the individual permanent magnet. The gaps or cavities in the rotor core obstruct the magnetic flux, since the vacuum has a relatively low magnetic permeability compared to the rotor core material (e.g., electrical steel).

The torque generated by the stator winding and the rotor flux field forms a uniform torque component and a variable torque component. The total output torque of the electric machine is a combination of the two components. Due to the variable torque component, a torque ripple phenomenon is generated, which causes the motor torque output speed to oscillate when the electric machine is used as the motor. The torque ripple in an electric motor is caused by the interaction between the harmonic magnetic flux generated by the permanent magnets and the current in the stator winding.

Figure 1:
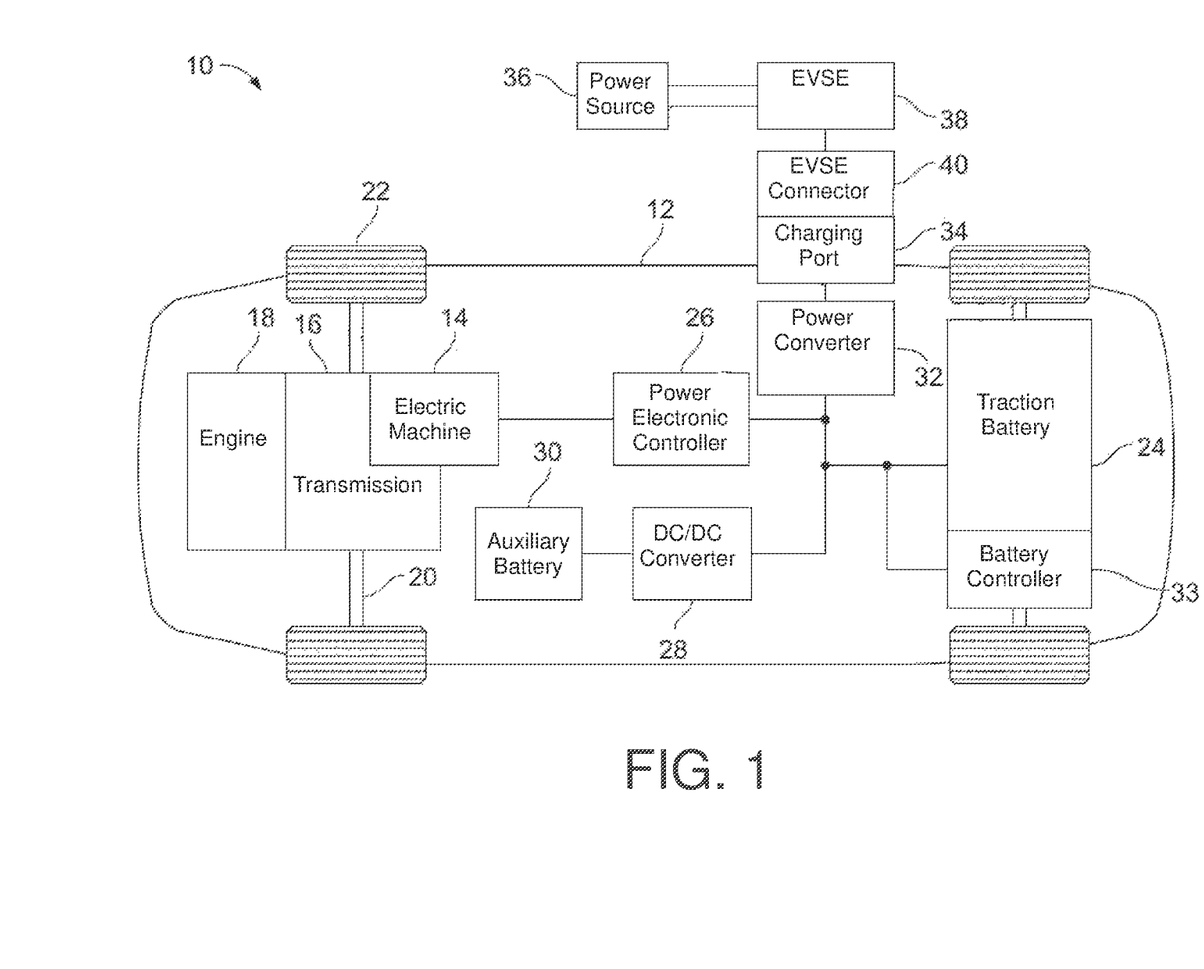
FIG. 1 is a schematic block diagram of a representative electric vehicle having an electric machine with a rotor core according to one or more embodiments.

FIG. 1 depicts a block diagram 10 of an electric vehicle 12 according to one or more embodiments of the present disclosure. The vehicle 12 comprises one or more electric machines 14 mechanically connected to a hybrid transmission 16. The electric machine 14 may be capable of operating as a motor or a generator. In addition, the hybrid transmission 16 may be mechanically connected to an engine 18. The hybrid transmission 16 may also be mechanically connected to a drive shaft 20 that is mechanically connected to the wheels 22. When the engine 18 is turned on or off, the electric machine 14 can provide propulsion or deceleration capabilities. The electric machine 14 can also be used as a generator, and can provide fuel economy benefits by recovering energy that is normally lost as heat in a friction braking system. The electric machine 14 may also provide reduced emissions since the hybrid electric vehicle 12 may be operated in an electric mode or a hybrid mode under certain conditions to reduce the overall fuel consumption of the vehicle 12. The electric machine 14 includes a rotor comprised of stacked rotor laminations having outer edge features as described herein to reduce torque ripple oscillations during both low speed and high speed operation.

A traction battery (or battery pack) 24 stores and provides energy that can be used by the electric machine 14. The traction battery 24 may provide high voltage DC output from one or more battery cell arrays (sometimes referred to as a battery cell stack) within the traction battery 24. The battery cell array may comprise one or more battery cells. The traction battery 24 may be electrically connected to one or more power electronic controllers 26 by one or more contactors (not shown). One or more contactors isolate the traction battery 24 from other components when opened, and connect the traction battery 24 to other components when closed.

The power electronic controller 26 may also be electrically connected to the electric machine 14 and may be configured to transfer electric energy between the traction battery 24 and the electric machine 14 in both directions. For example, the traction battery 24 may provide a DC voltage, while the electric machine 14 may require a three-phase AC voltage to function. The power electronic controller 26 can convert the DC voltage into a three-phase AC voltage according to the requirements of the electric machine 14. In a regenerative mode, the power electronic controller 26 can act as a generator to convert the three-phase AC voltage from the electric machine 14 into the DC voltage required by the traction battery 24. The parts described here also apply to pure electric vehicles. For pure electric vehicles, the hybrid transmission 16 may be a gear box connected to the electric machine 14, and the engine 18 may not be present.

In addition to providing energy for propulsion, the traction battery 24 can also provide energy for other electrical systems of the vehicle. A DC/DC converter 28 can convert the high-voltage DC output of the traction battery 24 into a low-voltage DC power source compatible with other vehicle loads. Other high-voltage loads, such as compressors and electric heaters, can be directly connected to the high-voltage without using the DC/DC converter 28. The low voltage system may be electrically connected to an auxiliary battery 30 (for example, a 12V battery).

A battery controller 33 may communicate with the traction battery 24. The battery controller 33 may be configured to monitor and manage the operation of the traction battery 24, such as by means of an electronic monitoring system (not shown) that manages the temperature and state of charge of each battery cell.

For example, the vehicle 12 may be an electric vehicle, which comprises components for a plug-in hybrid electric vehicle (PHEV), a full hybrid electric vehicle (FHEV), a mild hybrid electric vehicle (MHEV), or a battery electric vehicle (BEV). The traction battery 24 can be recharged by an external power source 36. The external power source 36 may be a connection to a power socket. The external power source 36 may be electrically connected to an electric vehicle power supply equipment (EVSE) 38. The EVSE 38 may provide circuits and controls for adjusting and managing the power transfer between the power source 36 and the vehicle 12. The external power source 36 may provide DC or AC power to the EVSE 38.

The EVSE 38 may have a charging connector 40 for plugging into a charging port 34 of the vehicle 12. The charging port 34 may be any type of port configured to transfer power from the EVSE 38 to the vehicle 12. The charging port 34 may be electrically connected to a charger or a power converter 32. The power converter 32 may adjust the power supplied from the EVSE 38 to provide the traction battery 24 with appropriate voltage and current levels. The power converter 32 may connect to the interface of the EVSE 38 to coordinate power delivery to the vehicle 12. An EVSE connector 40 may have pins that mate with corresponding grooves of the charging port 34.

Figure 2:
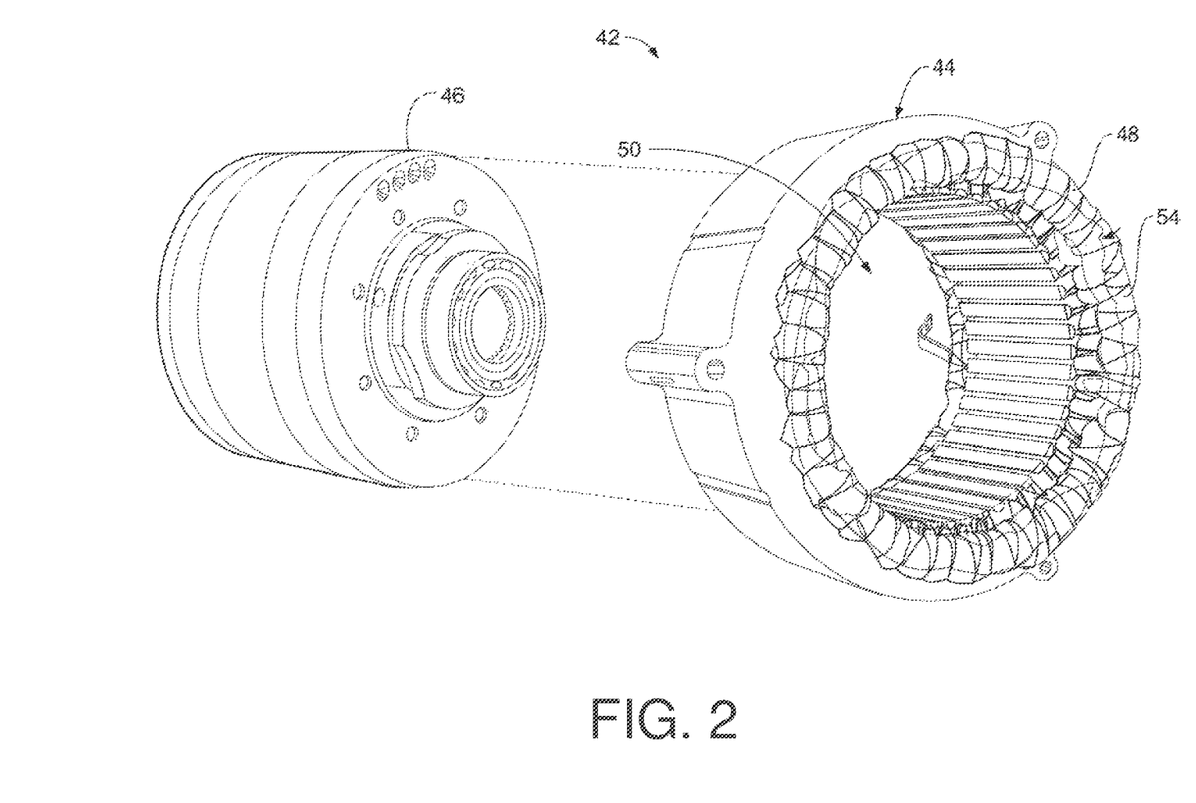
FIG. 2 is a perspective view of a representative electric machine with a rotor core according to one or more embodiments.

FIG. 2 shows a representative electric machine for an electric vehicle having a rotor with asymmetric edge contours, generally referred to herein as electric machine 42. The electric machine 42 may comprise a stator 44 and a rotor 46. In some examples, the electric vehicle may comprise two electric machines. One electric machine can be mainly used as a motor and the other electric machine can be mainly used as a generator. The motor can be operating to convert electric power into mechanical power and the generator can be operating to convert mechanical power into electric power.

In one example, the stator 44 may define a cavity 50. The size of the rotor 46 can be designed for being arranged and operating within the cavity 50. A shaft (not shown) operatively connected to the rotor 46 can drive the rotor 46 to rotate and/or transfer rotational energy generated by the operation of the rotor 46 to one or more subsystems of the vehicle 12. The stator 44 may comprise a winding 48 disposed around the outer circumference of the cavity 50 to surround the outer surface of the rotor 46. In an example where the electric machine is used as a motor, the current may be fed to the winding 48 to cause the rotor 46 to rotate. In an example where the electric machine is used as a generator, the current may be generated in the winding 48 by the rotation of the rotor 46 to power the components of the vehicle 12.

Figure 3A:
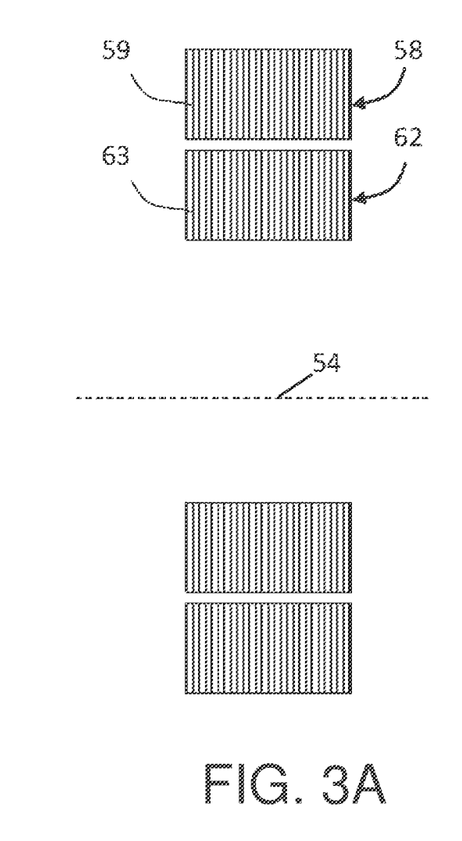
FIG. 3A is a partial cross-sectional view of the electric machine."

Referring to FIG. 3A, it shows a partial cross-sectional view of the electric machine 42. In one or more embodiments, the rotor 46 comprises a rotor core 62 formed of one or more rotor laminations 63. The stator 44 may comprise a stator core 58 formed of one or more stator laminations 59. The rotor core 62 rotates relative to the stator core 62 about the axis 54.

Figure 3B:
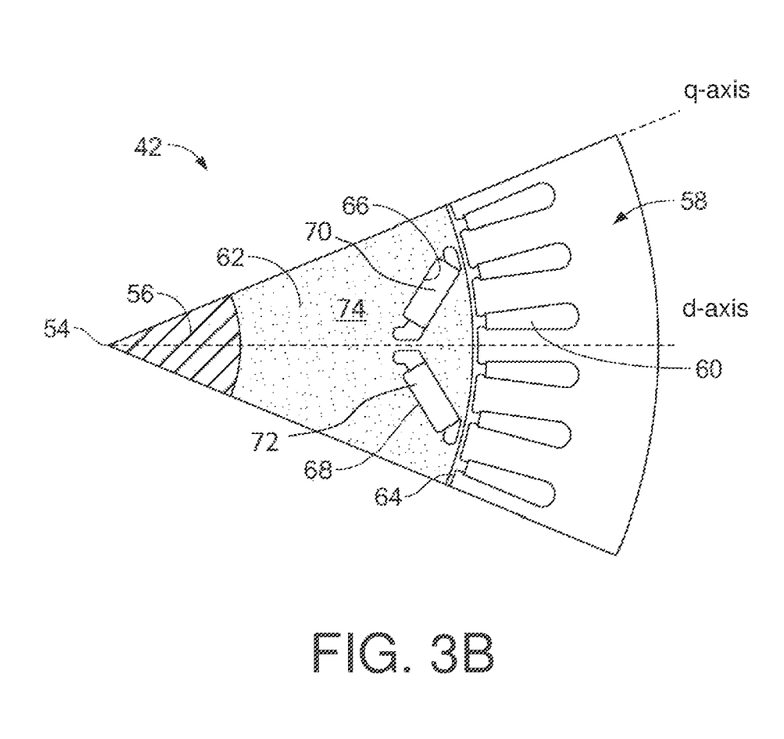
FIG. 3B is another partial cross-sectional view of the electric machine.

FIG. 3B shows a partial radial cross-sectional view 42 comprising the stator core 58 and the rotor core 62. The stator core 58 and the rotor core 62 may define an air gap 64 between the inner circumference of the stator core 58 and the outer circumference of the rotor core 62. The stator core 58 may define a plurality of slots 60 that extend radially from the inner circumference of the stator core 58 and are sized to accommodate or hold the coil winding (e.g., winding 48). The rotor core 62 may define a plurality of cavities disposed near the outer circumference of the rotor core 62, such as a first cavity 66 and a second cavity 68, and the first cavity 66 and the second cavity 68 are sized to receive magnets, such as a first magnet 70 and a second magnet 72. It should be understood that the magnet and cavity may comprise corresponding cross-sectional shapes perpendicular to the axis of rotation 54, such as the rectangular shape shown or alternatively an are shape. Further, as shown in the figure, the axis located in the middle of the magnetic pole 74 is called a d-axis, and the axis located between the magnetic poles (that is, between the magnetic pole 74 and the adjacent magnetic pole 74) is called a q-axis. The pair of adjacent cavities 66, 68 are symmetrical about the d-axis and arranged in a V-type. The first magnet 70 and the second magnet 72 are symmetrical about the d-axis and arranged in the corresponding first cavity 66 and the corresponding second cavity 68 in a V-type. The rotor core 62 may also define a circular central opening for receiving the drive shaft 56 and one or more openings (not shown) configured to accommodate the flow of cooling oil through the rotor 46.

Figure 4A:
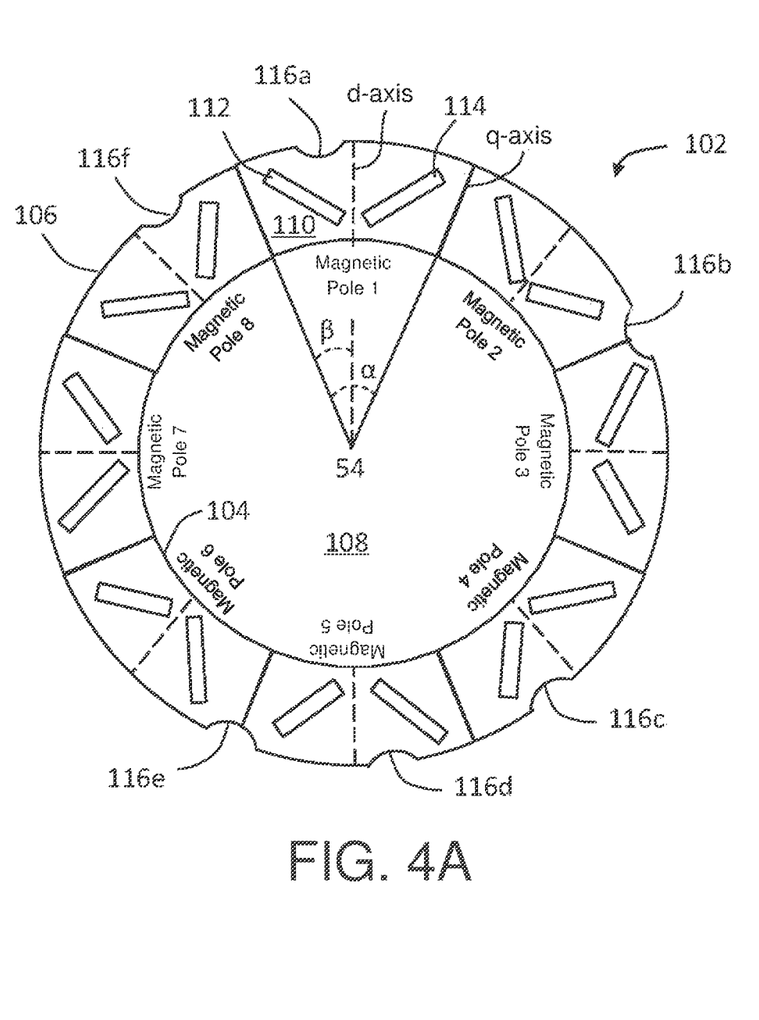
FIG. 4A is a schematic diagram of the rotor laminations of the electric machine shown in FIG. 2.

With reference to FIGS. 4A and 3B, a schematic diagram of the rotor lamination 102 according to one or more embodiments of the present disclosure is shown. The rotor core 62 may be formed of a plurality of stacked rotor laminations 102. Each lamination 102 can be made into the final geometric shape shown from a blank that is stamped or otherwise manufactured. The lamination can be steel or other magnetic materials. In one or more embodiments, the rotor lamination 102 is a ring or annular shape, and has an inner edge 104 and an outer edge 106 opposite to the inner edge 104. The inner edge 104 forms a central opening 108 that receives the drive shaft 56.

In the illustrated embodiment, the rotor core 62 comprises eight magnetic poles 110 labeled magnetic poles 1-8, respectively. It should be understood that other suitable numbers of magnetic poles can be provided as required. Further, as shown in the figure, the axis located in the middle of the magnetic pole 110 is called the d-axis, and the axis located between the magnetic poles (that is, between the magnetic pole 1 and either adjacent magnetic pole 2 or 8) is called the q-axis. In the case of eight magnetic poles 110, the angle α between adjacent q-axes is 45 degrees, and the angle β between adjacent d-axis and q-axis is 22.5 degrees. Each pole 110 has a pair of adjacent first openings 112 and second openings 114, and the openings 112, 114 are located between the inner edge 104 and the outer edge 106. Therefore, in one or more embodiments, the rotor lamination 102 has a total of 8 pairs of first openings 112 and second openings 114. The pair of adjacent openings 112, 114 are symmetrical about the d-axis and arranged in a V-type. In one or more embodiments, the openings 112, 114 of the plurality of rotor laminations 102 are superimposed to form the first cavity 66 and the second cavity 68 of the rotor core 62, respectively. Therefore, the rotor core 62 also has 8 pairs of the first cavities 66 and the second cavities 68. In one or more embodiments, the magnets 114 are permanent magnets and each of them may comprise one or more of the following: ferrite magnets, alnico magnets, rare earth magnets (such as but not limited to neodymium iron boron (NedFeB)), etc. In one or more embodiments, the first magnet 116 and the second magnet 118 may be formed as a single piece of magnet respectively. In other embodiments, the first magnet 116 and the second magnet 118 may also be formed by stacking a plurality of magnet blocks, respectively. Further, the first magnet 116 and the second magnet 118 may be arranged in alignment along the direction of the central axis of the rotor, respectively. Compared with the traditional arrangement of multiple magnet blocks that are staggered and inclined, the alignment arrangement can help increase the torque, simplify the manufacturing, and save costs.

Further, in order to reduce the torque pulsation of the electric machine, each rotor lamination 102 comprises a plurality of arcuate grooves or scallops (magnetic air gaps) 116a-116f asymmetrically arranged on the outer edge 106 of the rotor lamination 102. In one or more embodiments, the so-called asymmetrical design refers to a plurality of grooves on the outer edge 106 of the lamination 102 that are asymmetrically spaced about the circumferential direction to make the rotor lamination 102 asymmetrical as a whole. In one or more embodiments, at least one of the plurality of grooves 116 is located on the q-axis, such as groove 116b or 116e. Further, at least one of the plurality of grooves 116 is located between the d-axis and the q-axis, such as groove 116c or 116d. Specifically, as shown in FIG. 4A, the rotor lamination 102 comprises a groove 116a on the magnetic pole 1 and between the d-axis and the q-axis, a groove 116b on the magnetic pole 2 and the magnetic pole 3 and also on the q-axis, a groove 116e located on the magnetic pole 4 and between the d-axis and the q-axis, a groove 116d located on the magnetic pole 5 and between the d-axis and the q-axis, a groove 116e located on the magnetic pole 5 and the magnetic pole 6 and also on the q-axis, and a groove 116f located on the magnetic pole 8 and between the d-axis and the q-axis. In addition, the grooves 116a. 116c. 116d, and 116f located between the d-axis and the q-axis are closer to the d-axis than the q-axis. The plurality of grooves 116a-116f are located on different magnetic poles, or in other words, there are no complete two or more grooves on the same magnetic pole 110. Although FIG. 4A shows the specific arrangement of the plurality of grooves 116a-116f, it should be understood that the plurality of grooves 116a-116f of the rotor lamination of the present disclosure may also have other arrangements.

Figure 4B:
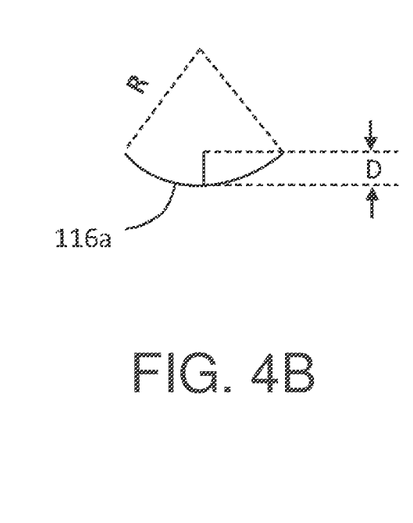
FIG. 4B is a partial schematic diagram of the rotor laminations in FIG. 4A.

FIG. 4B schematically shows an enlarged view of a representative groove 116a in FIG. 4A. In one or more embodiments, the grooves 116 may be arc-shaped grooves. Each arc-shaped groove has a radius R and a depth D. In one or more embodiments, the radius R of the arc-shaped groove is between 0.5 mm and 2 mm, and the depth D of the arc-shaped groove is less than or equal to 1.5 mm. It should be understood that, in other embodiments, the grooves 116 may also have other shapes, such as a rectangle or a triangle. Embodiments having one or more rectangular grooves may have a length less than or equal to 5 mm and depth less than or equal to 1.5 mm Embodiments having one or more triangular grooves may have triangles with an angle less than 180 degrees and depth less than or equal to 1.5 mm.

Figure 5:
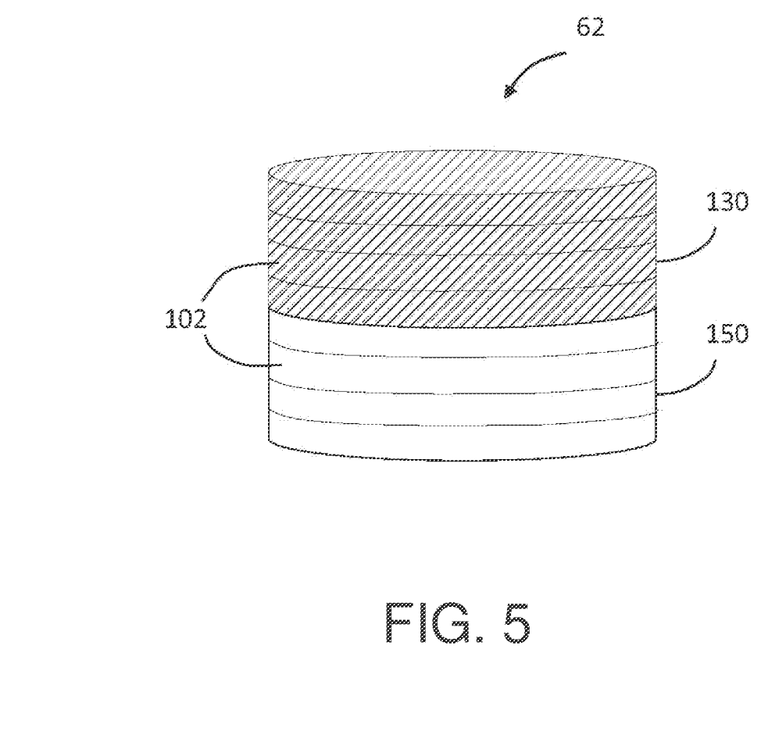
FIG. 5 is a perspective view of a representative rotor core with a plurality of blocks of rotor laminations.
Figure 6:
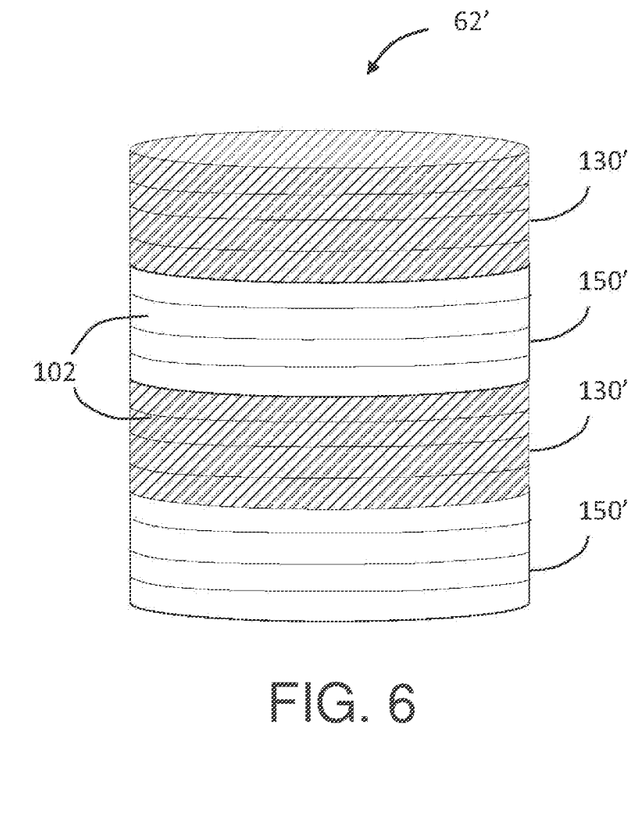
FIG. 6 is a perspective view of a different representative rotor core with a plurality of blocks of rotor laminations.

Referring to FIG. 5 and FIG. 6, the rotor core 62, 62' comprises a first block 130, 130' and a second block 150, 150' each formed by stacking one or more rotor laminations 102, respectively. Each block is rotated or flipped relative to an adjacent block as illustrated and described with respect to FIGS. 7A and 7B.

Figure 7A:
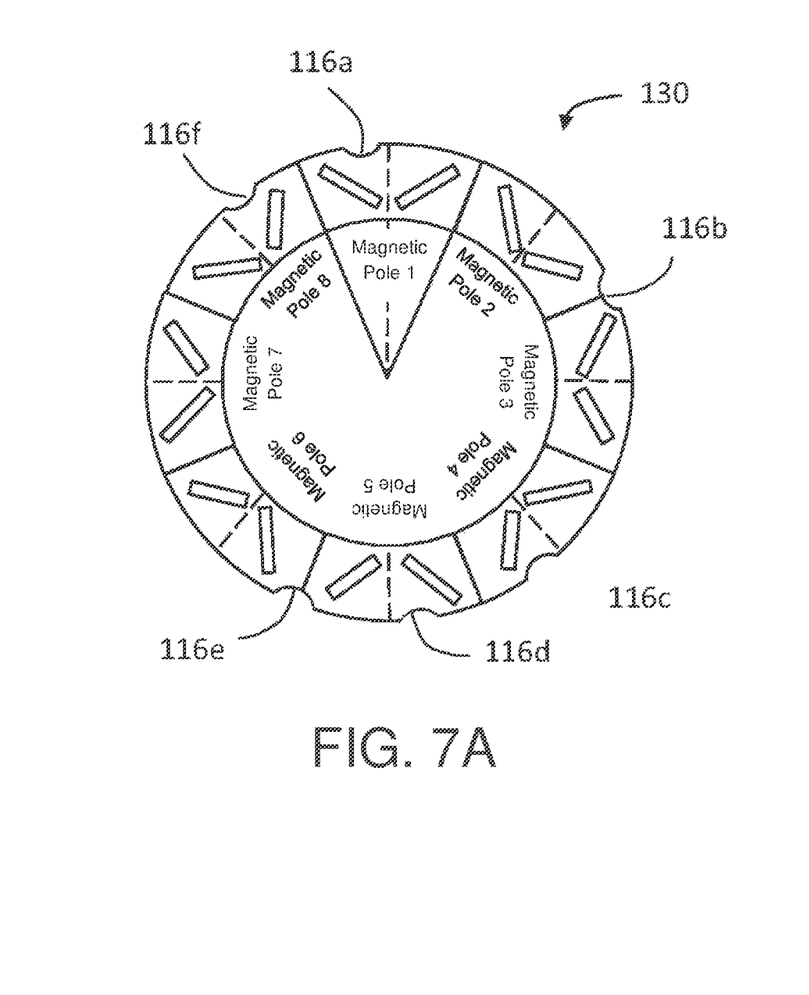
FIG. 7A is a top view of a first block of a rotor core with a plurality of laminations.
Figure 7B:
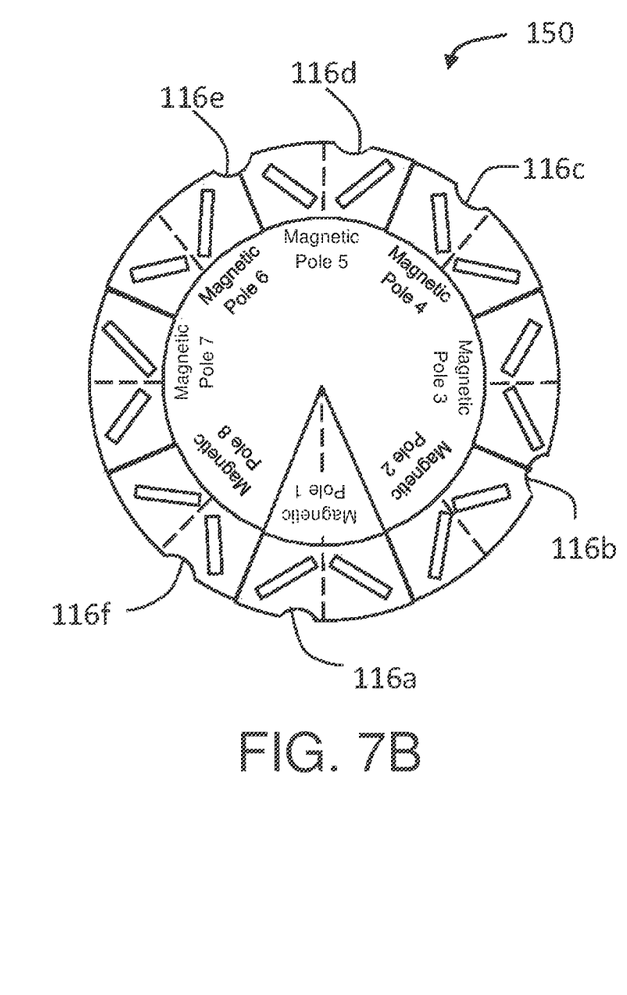
FIG. 7B is a top view of a second block of a rotor core with a plurality of laminations.

Continuing to refer to FIGS. 7A and 7B, FIG. 7A schematically shows a top view of the first block 130, and FIG. 7B schematically shows a top view of the second block 150. In one or more embodiments, the second block 150 is rotated or flipped by 180 degrees relative to the first block 130. It should be understood that in the embodiment illustrated in FIGS. 7A and 7B, the second block 150 is flipped or rotated out of the plane of the page relative to the first block 130 instead of being rotated within the plane of the page by 180 degrees as may be seen by comparison of the location of the magnetic poles 2-8 relative to magnetic pole 1. The plurality of grooves, such as 116a-116f, of the one or more rotor laminations 102 of the first block 130 are arranged to align respectively, and the plurality of first openings 112 and second openings 114 on the one or more rotor laminations 102 are arranged to align with each other respectively to form a part in the direction of the axis 54 of the first cavity 66 and the second cavity 68 of the rotor core 62 in FIG. 3B. The multiple grooves, such as 116a-116f, of the one or more rotor laminations 102 of the second block 150 are also arranged to align, and the multiple first openings 112 and second openings 114 on the one or more rotor laminations 102 are arranged to align with each other to form another portion in the direction of the axis 54 of the first cavity 66 and the second cavity 68 of the rotor core 62 in FIG. 3B.

Since the plurality of first openings 112 and second openings 114 on the rotor lamination 102 are evenly and symmetrically arranged in the circumferential direction, when the first block 130 and the second block 150 are assembled to form the rotor core, the plurality of first openings 112 and the second opening 114 on the first block 130 and the plurality of first openings 112 and the second opening 114 on the second block 150 are respectively aligned with each other to form the first cavities 66 and the second cavities 68 of the rotor core 62. According to one aspect of the present disclosure, to manufacture the rotor core 62 of the present disclosure, only one specification of the rotor laminations is required, and no additional mold opening is required, thus saving the manufacturing cost.

According to another aspect of the present disclosure, to reduce torque pulsation, asymmetrically arranged grooves are used on the rotor lamination 102. Further, although the rotor lamination 102 is of asymmetrical design, the second block 150 is flipped by 180 degrees relative to the first block 130 to solve or at least partially solve the electromagnetic deviation and mass imbalance. Therefore, the electric machine of the present disclosure can also obtain the same or similar performance during forward and reverse rotation.

With reference to Table 1 and Table 2 below. Table 1 shows the torque pulsation of the conventional design and the present disclosure at the 24th and 48th order mechanical frequency at a rotation speed of 1000 rpm. Table 2 shows the torque pulsation of the conventional design and the present disclosure at the 24th and 48th order mechanical frequencies at a rotation speed of 14000 rpm. In one or more embodiments, the conventional design is a design with symmetrically arranged rotor laminations. It can be seen that under the 24th and 48th order mechanical frequencies, the torque pulsation of the electric machine of the present disclosure has been significantly improved regardless of the rotation speed of 1000 rpm or the rotation speed of 14,000 rpm as indicated by the reduction of torque ripple from 4.4% to 4.0% for the $24^{th}$ harmonic and from 3.% to 2.3% at the $48^{th}$ harmonic at 1,000 rpm. Similarly, torque ripple is reduced for the $24^{th}$ harmonic from 7.8% to 7.0% and for the $48^{th}$ harmonic from 3.8% to 3.4% at 14,000 rpm.

TABLE 1

Comparison of Conventional Design to Present Disclosure at 1,000 rpm.

| Harmonics | Conventional Design | | Present Disclosure | |
|---|---|---|---|---|
| | Torque/Nm | Percentage % | Torque/Nm | Percentage % |
| Fundamental | 99.87133 | — | 97.805 | — |
| 24th | 4.453658 | 4.4% | 3.944709 | 4.0% |
| 48th | 3.226267 | 3.2% | 2.280207 | 2.3% |

TABLE 2

Comparison of Conventional Design to Present Disclosure at 14,000 rpm.

| Harmonics | Conventional Design | | Present Disclosure | |
|---|---|---|---|---|
| | Torque/Nm | Percentage % | Torque/Nm | Percentage % |
| Fundamental | 39.45298 | — | 38.06154 | — |
| 24th | 3.104071 | 7.8% | 2.680321 | 7.0% |
| 48th | 15.01857 | 3.8% | 13.31814 | 3.4% |

Although in one or more embodiments, the rotor core 62 may comprise one first block 130 and one second block 150 as shown in FIG. 5, it should be understood that in other embodiments, the rotor core 62 may comprise any suitable number of first blocks 130 and second blocks 150. For example, as shown in FIG. 6, the rotor core 62' may comprise first blocks 130' and second blocks 150' arranged alternately. In one or more embodiments, in order to solve or at least partially solve the problems of electromagnetic deviation and mass imbalance, the number of first blocks 130' and the number of second blocks 150' are equal. Further, in one or more embodiments, the number of the rotor laminations in the first block 130 is equal to (or within 1 of) the number of the rotor laminations in the second block 150.

In other embodiments, the number of the first block 130' and the number of the second block 150' may not be equal, and the number of the rotor laminations 102 of the first block 130' and the number of the rotor laminations 102 of the second block 150' may not be equal, but the number of the rotor laminations 102 in the first portion of the rotor core 62' is approximately equal to the number of the second portion of the rotor laminations 102 flipped by 180 degrees, which can also solve or at least partly solve the problem of electromagnetic deviation and mass imbalance, wherein the sum of the number of the rotor laminations 102 in the first portion and the number of the rotor laminations 102 in the second portion is equal to the number of the rotor laminations in the entire rotor core 62'. In addition, it should be understood that the rotor laminations of the first portion are not necessarily adjacent to each other, and the rotor laminations of the second portion are not necessarily adjacent to each other. The rotor laminations of the first portion and the rotor laminations of the second portion may be arranged alternately, comprising regular or irregular alternate settings.

Although representative embodiments are described above, it is not meant that these embodiments describe all possible forms covered by the claims. The words used in the specification are descriptive words rather than restrictive words, and it should be understood that various changes can be made without departing from the claimed subject matter. As mentioned above, the features of the various embodiments can be combined to form further embodiments of the present disclosure that may not be explicitly described or illustrated. Although various embodiments can be described as providing advantages or advantages over other embodiments or prior art implementations in terms of one or more desired characteristics, those of ordinary skill in the art recognize that, depending on specific applications and implementations, one or more features or characteristics can be compromised to achieve the desired overall system properties. These attributes comprise but are not limited to cost, strength, durability, life cycle cost, marketability, appearance, packaging, size, maintainability, weight, manufacturability, case of assembly, etc. Therefore, embodiments described as less desirable than other embodiments or prior art implementations in one or more characteristics are outside the scope of the present disclosure and may be expected for specific applications.

What is claimed is:

1. An electric machine, comprising:
   a stator; and
   a rotor rotatably supported in the stator, the rotor comprising a plurality of rotor laminations stacked to form a rotor core with cavities having magnets arranged in the cavities, wherein each rotor lamination includes an outer edge having a plurality of arcuate grooves arranged asymmetrically about the outer edge, wherein a first portion of the plurality of rotor laminations are rotated by 180 degrees about a diametric axis of the rotor relative to a second portion of the plurality of rotor laminations.

2. The electric machine according to claim 1, wherein a quantity of the first portion of the plurality of rotor laminations is equal to a quantity of the second portion of the plurality of rotor laminations.

3. The electric machine according to claim 2, wherein the rotor comprises eight magnetic poles and each of the plurality of rotor laminations includes six arcuate grooves arranged radially asymmetrically about the outer edge.

4. The electric machine according to claim 1, wherein at least one of the plurality of arcuate grooves is located on a q-axis extending between two adjacent magnetic poles.

5. The electric machine according to claim 1, wherein at least one of the plurality of arcuate grooves is located between a d-axis extending between two adjacent ones of the magnets arranged in the cavities and a q-axis extending between two radially adjacent magnetic poles.

6. The electric machine according to claim 1, wherein the plurality of arcuate grooves have a radius between 0.5 mm and 2 mm.

7. The electric machine according to claim 6, wherein the plurality of arcuate grooves have a depth less than or equal to 1.5 mm.

8. The electric machine according to claim 1, wherein the cavities are arranged in a plurality of cavity pairs, each cavity pair including a first cavity arranged in a V-shape relative to a second cavity.

9. The electric machine according to claim 8, wherein each cavity includes at least one of the plurality of magnets and the plurality of magnets are aligned along a direction of a central axis of the rotor.

10. The electric machine according to claim 1, wherein the rotor core comprises a first block and a second block each respectively formed by one or more of the plurality of rotor laminations, and wherein the second block is rotated by 180 degrees about a diametric axis of the rotor relative to the first block.

11. The electric machine according to claim 10, wherein a number of the plurality of rotor laminations in the first block and a number of the plurality of rotor laminations in the second block are equal.

12. An electric machine rotor comprising:
a plurality of rotor laminations stacked to form a rotor core, each rotor lamination being an annular shape having an inner edge and an outer edge, the rotor core having cavities arranged between the inner edges and the outer edges of the laminations; and
permanent magnets arranged in the cavities, wherein each of the plurality of rotor laminations includes an asymmetrically scalloped edge having a plurality of grooves arranged asymmetrically about a circumference, and wherein a first portion of the plurality of rotor laminations are rotated by 180 degrees about a diametrical axis relative to a second portion of the plurality of rotor laminations.

13. The electric machine rotor according to claim 12, wherein one of the plurality of grooves is symmetrically positioned relative to a q-axis extending between radially adjacent magnetic poles of the rotor.

14. The electric machine rotor according to claim 13, wherein the one of the plurality of grooves is located between a d-axis positioned symmetrically relative to one pole of the magnetic poles.

15. The electric machine rotor according to claim 14, wherein the rotor includes eight magnetic poles and each of the plurality of rotor laminations includes six grooves asymmetrically arranged about an outer circumference.

16. An electrified vehicle comprising:
a traction battery; and
an electric machine powered by the traction battery, the electric machine including:
a stator; and
a rotor rotatably supported in the stator, the rotor comprising a plurality of rotor laminations stacked to form a rotor core with cavities having magnets arranged in the cavities and aligned along a central axis of the rotor, wherein each of the plurality of rotor laminations includes an outer edge having a plurality of grooves arranged asymmetrically around the outer edge, the plurality of laminations including a first block and a second block each having one or more of the plurality of rotor laminations, wherein the second block is rotated by 180 degrees about a diametric axis of the rotor relative to the first block.

17. The electrified vehicle according to claim 16, wherein a number of the rotor laminations in the first block is equal to the number of the rotor laminations in the second block.

18. The electrified vehicle according to claim 17, wherein the plurality of magnets are arranged in a plurality of magnet pairs, each magnet pair including a first magnet arranged in a V-shape relative to a second magnet of the pair.

19. The electrified vehicle according to claim 18, wherein the plurality of magnet pairs define eight magnetic poles of the rotor, and wherein each of the plurality of rotor laminations includes six grooves positioned asymmetrically around the outer edge.

* * * * *